(12) United States Patent
Shen

(10) Patent No.: US 9,001,315 B2
(45) Date of Patent: Apr. 7, 2015

(54) LENS ASSEMBLY TESTING METHOD

(71) Applicant: Hon Hai Precision Industry Co., Ltd., New Taipei (TW)

(72) Inventor: Hung-Tsan Shen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/062,872

(22) Filed: Oct. 24, 2013

(65) Prior Publication Data

US 2015/0062566 A1  Mar. 5, 2015

(30) Foreign Application Priority Data

Aug. 27, 2013  (TW) .............................. 102130599 A

(51) Int. Cl.
*G01M 11/00* (2006.01)
*G01M 11/02* (2006.01)

(52) U.S. Cl.
CPC ................................. *G01M 11/0292* (2013.01)

(58) Field of Classification Search
USPC .................................................. 356/124–127
See application file for complete search history.

*Primary Examiner* — Tri T Ton
(74) *Attorney, Agent, or Firm* — Novak Druce Connolly Bove + Quigg LLP

(57) ABSTRACT

A lens assembly testing method includes: providing a lens assembly having a first lens and a second lens placed on the first lens; determining whether a modulation transfer function value of the lens assembly is in a predetermined range; if not, separating the first lens and the second lens, and forming a first coating layer and a second coating layer on the first lens to obtain a coated first lens with a number of dots; capturing two images of the coated first lens; attaching the coated first lens on the second lens, and capturing another two images of the coated first lens; determining an actual moving distance of a chosen dot using a 3D-Digital image correlation method according to the four images; adjusting a size of the first lens according to the actual moving distance; and displaying the adjusted size of the first lens to a user.

11 Claims, 4 Drawing Sheets

LENS ASSEMBLY TESTING METHOD

BACKGROUND

1. Technical Field

The present disclosure relates to a lens assembly testing method.

2. Description of Related Art

A lens assembly includes a first lens and a second lens assembled to the first lens. During a manufacturing process of the lens assembly, a fit relationship between the first lens and the second lens influences a modulation transfer function (MTF) value of the lens assembly, which further influences an image quality of the lens assembly. Users can decide the first lens is loose fit with the second lens by observing whether the first lens is easily separated form the second lens. However, it is difficult for the users to decide whether the first lens is interferingly fit with the second lens.

Therefore, it is desirable to provide a lens assembly testing method that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1A:
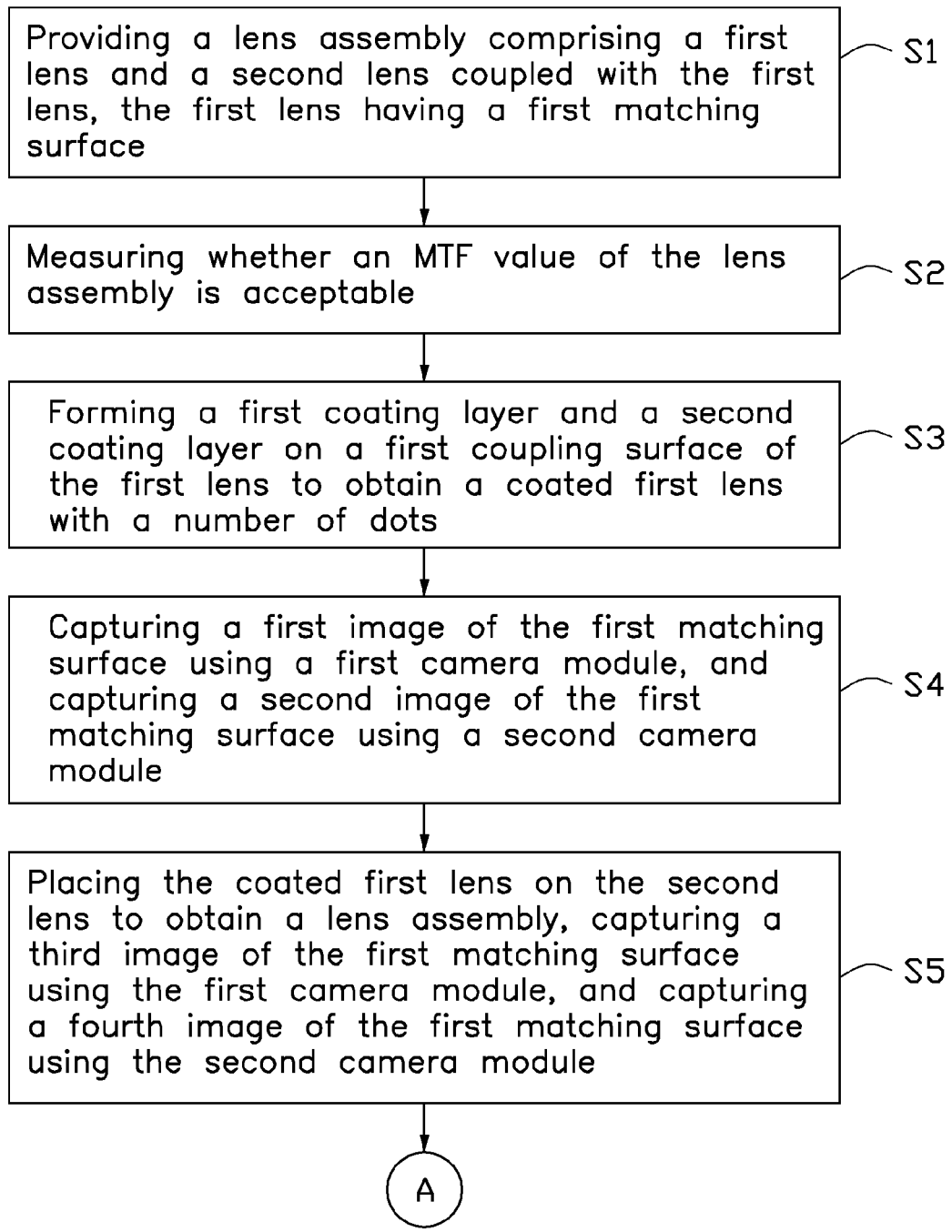
FIG. 1A and FIG. 1B are flow charts of a lens assembly testing method, according to an exemplary embodiment.
Figure 1B:
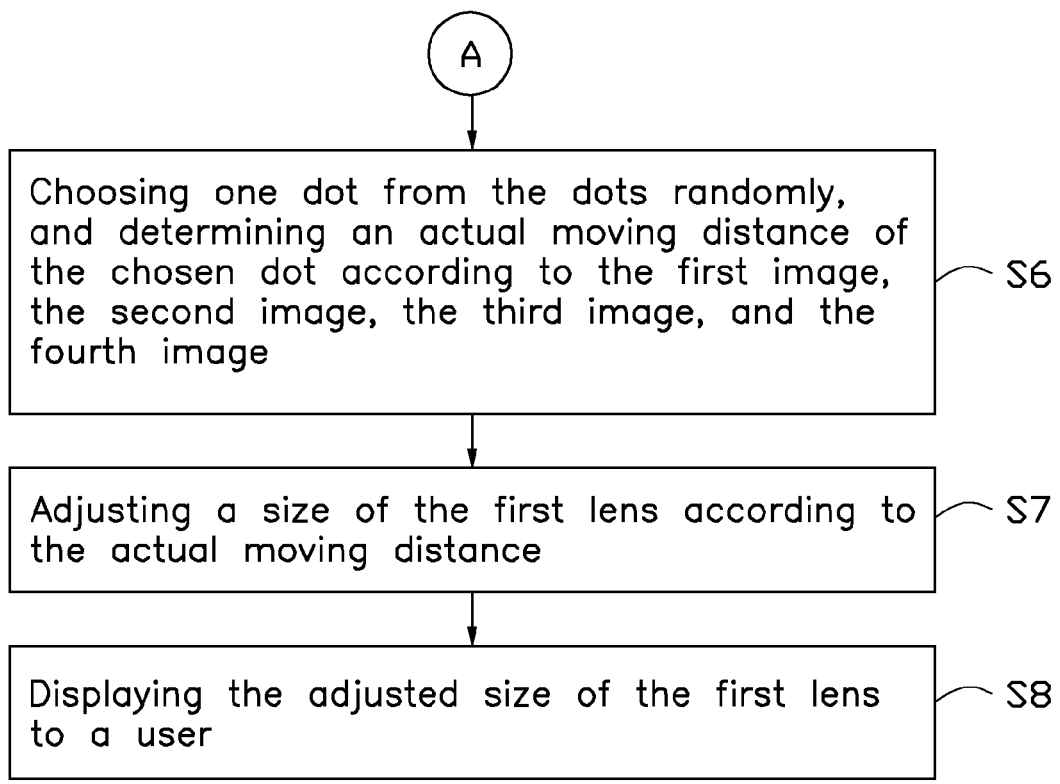
Figure 2:
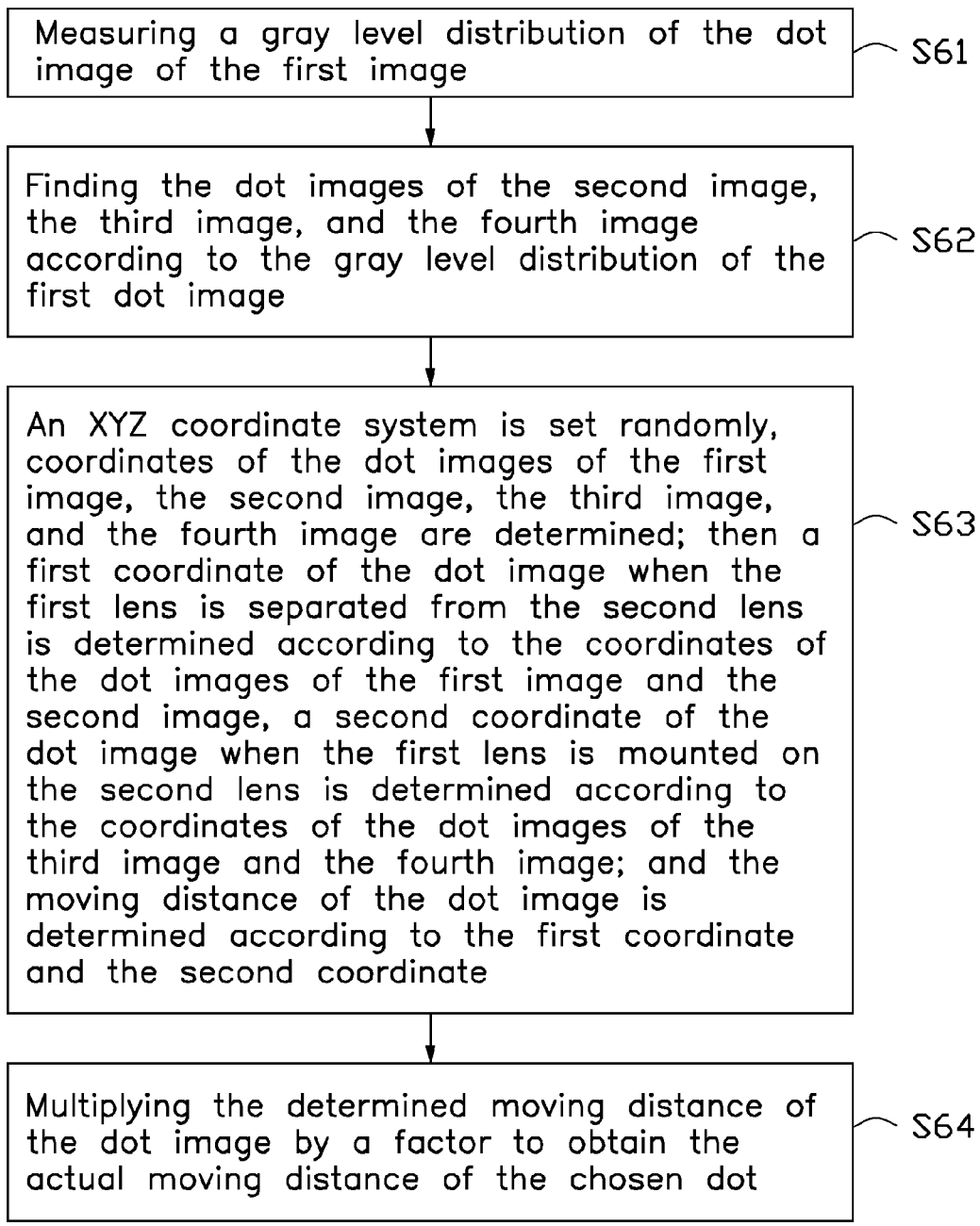
FIG. 2 is a sub-flow chart of the lens assembly testing method of FIG. 1.
Figure 3:
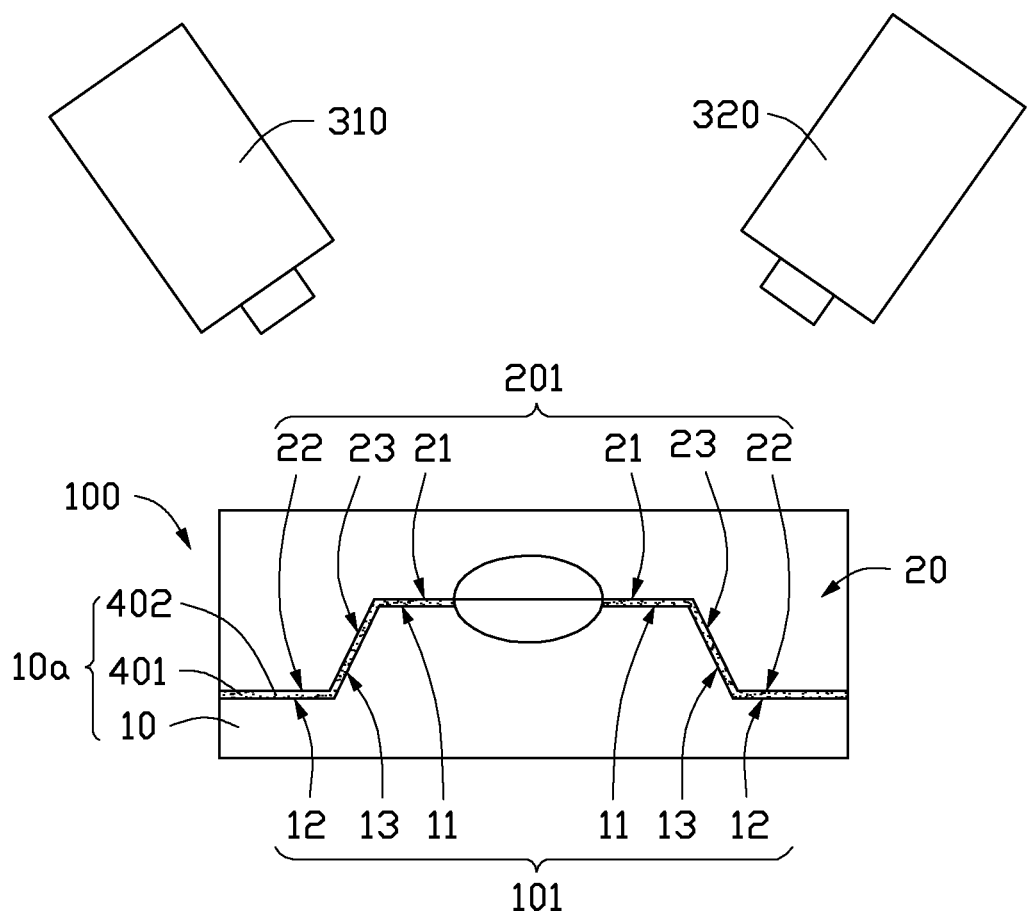
FIG. 3 is a schematic view of the lens assembly testing method of FIG. 1.

FIGS. 1A-3 illustrate a lens assembly testing method. The lens assembly testing method includes the following steps.

In step S1, a lens assembly 100 is provided, and the lens assembly 100 includes a first lens 10 and a second lens 20 optically and mechanically coupled with the first lens 10. Both of an optical axis of the first lens 10 and an optical axis of the second lens 20 are substantially coaxial with an optical axis of the lens assembly 100.

The first lens 10 includes a first matching surface 101. The first matching surface 101 includes a first annular surface 11, a second annular surface 12, and a first frustoconical surface 13. The first frustoconical surface 13 is connected between the first annular surface 11 and the second annular surface 12.

The second lens 20 includes a second matching surface 201. The second matching surface 201 includes a third annular surface 21, a fourth annular surface 22, and a second frustoconical surface 23. The second frustoconical surface 23 is connected between the third annular surface 21 and the fourth annular surface 22.

The first matching surface 101 contacts the second matching surface 201. In particular, the first annular surface 11 contacts the third annular surface 21, the second annular surface 12 contacts the two fourth annular surface 22, and the first frustoconical surface 13 contacts the second frustoconical surface 23.

In step S2: the MTF value of the lens assembly 100 is measured to determine whether the first lens 10 is interferingly fit with the second lens 20. If the MTF value of the lens assembly 100 is in a predetermined range, the first lens 10 is determined to be not interferingly fit with the second lens 20, then the lens assembly 100 can be used as a standard lens assembly to manufacture other lens assemblies. If the MTF value of the lens assembly 100 is not in a predetermined range, the first lens 10 is determined to be interferingly fit with the second lens 20, and the method goes to step S3. In particular, a size of the first lens 10 includes a distance between the optical axis of the first lens 10 and an intersection of the first annular surface 11 and the first frustoconical surface 13 (i.e. a first inner diameter $\phi 1$ of the first lens 10), and a distance between the optical axis of the first lens 10 and an intersection of the second annular surface 12 and the first frustoconical surface 13 (i.e. a second inner diameter $\phi 2$ of the first lens 10).

In step S3, the first lens 10 is separated from the second lens 20, and a first coating layer 401 and a second coating layer 402 are formed on the first matching surface 101 to obtain a coated first lens 10a with a number of dots formed on the first matching surface 101.

The first coating layer 401 completely covers the first matching surface 101, the second coating layer 402 includes a number of dots formed on the first coating layer 401. Shapes of the dots are different from each other, and sizes of the dots are different from each other. A color of the first coating layer 401 is different from a color of the second coating layer 402. In this embodiment, the color of the first coating layer 401 is white, and the color of the second coating layer 402 is black, and thus the dots are black dots.

In step S4, a first camera module 310 and a second camera module 320 are provided. In this embodiment, an optical axis of the first camera module 310 and an optical axis of the second camera module 320 are symmetrical with respect to the optical axis of the lens assembly 100, an inclined angel between the optical axis of the first camera module 310 and the optical axis of the lens assembly 100 is about 45 degrees, and an inclined angel between the optical axis of the second camera module 320 and the optical axis of the lens assembly 100 is about 45 degrees. The first camera module 310 captures a first image of the first matching surface 101, and the second camera module 320 captures a second image of the first matching surface 101.

In step S5, the coated first lens 10a is attached to the second lens 20 to obtain the lens assembly 100, then the first camera module 310 captures a third image of the first matching surface 101, and the second camera module 320 captures a fourth image of the first matching surface 101. The coated first lens 10a is placed at a same position on the second lens 20 as the first lens 10.

In step S6, one dot is chosen from the dots randomly, and an actual moving distance of the chosen dot is determined using a 3D-Digital Image Correlation (3D-DIC) method according to the first image, the second image, the third image, and the fourth image. In particular, the actual moving distance is a moving distance from a position of the chosen dot when the first lens 10 is separated from the second lens 20 to a position of the chosen dot when the first lens 10 is assembled to the second lens 20. Each of the first image, the second image, the third image, and the fourth image has a dot image corresponding to the chosen dot. The 3D-DIC method is a well known technology and uses the dot images of the first image, the second image, the third image, and the fourth image to calculate.

In step S7, the size of the first lens 10 is adjusted according to the actual moving distance of the chosen dot. In particular, the first inner diameter $\phi 1$ and the second inner diameter $\phi 2$ are reduced by a value equal to the actual moving distance.

In step S8, the adjusted size of the first lens 10 is displayed to a user.

The steps S1-S8 are repeated until the MTF value of the lens assembly 100 is in a predetermined range, and then the lens assembly 100 can be used as a standard lens assembly to manufacture other lens assemblies. The predetermined range of the MTF value may be determined according to practical use.

An image of the first lens 10 has a number of dot images corresponding to the dots respectively. Each dot image has a number of pixels. Each of the pixels has a gray level value. Because the sizes of the dots are different from each other, and the shapes of the dots are different from each other, the gray level distributions of the dot images are different from each other. When the first lens 10 is interferingly fit with the second lens 20, the first coating layer and the second coating layer are squeezed, and thus the first coating layer and the second coating layer are deformed, but the gray level distribution of each dot image is changeless because the relative positions of the pixels of each dot image are changeless.

In particular, the step S6 further includes the following steps.

In step S61, the gray level distribution of the dot image of the first image is measured.

In step S62, the dot images of the second image, the third image, and the fourth image are found according to the gray level distribution of the dot image of the first image. Each of the gray level distributions of the dot images of the second image, the third image, and the fourth image is substantially the same as the gray level distribution of the dot image of the first image.

In step S63, an XYZ coordinate system is set randomly, and has an X-axis, a Y-axis, and a Z-axis. In this embodiment, the optical axis of the first lens 10 is set as the Z-axis, a long edge of the first image is set as the X-axis, and the short edge of the first image is set as the Y-axis. According to the 3C-DIC method, firstly, a coordinate of the dot image of the first image, a coordinate of the dot image of the second image, a coordinate of the dot image of the third image, and a coordinate of the dot image of the fourth image are determined; then a first coordinate (x1, y1, z1) of the dot image when the first lens 10 is separated from the second lens 20 is determined according to the coordinate of the dot image of the first image and the coordinate of the dot image of the second image, a second coordinate (x2, y2, z2) of the dot image when the first lens 10 is assembled to the second lens 20 is determined according to the coordinate of the dot image of the third image and the coordinate of the dot image of the fourth image; and the moving distance of the dot image is substantially equal to $\sqrt{(x1-x2)^2+(y1-y2)^2+(z1-z2)^2}$.

In step S64, the actual moving distance of the chosen dot is determined through multiplying the determined moving distance of the dot image by a factor. The factor is obtained as following. An object of which a length along a predetermined direction is L1 is captured to obtain a reference image. The reference image includes an object image corresponding to the object. The length of the object image along the predetermined direction is measured as L2, then the factor is substantially equal to L1/L2.

By employing the testing method, the size of the first lens 10 can be determined to make sure the first lens 10 is not interferingly fit with the second lens, and thus the image quality of the lens assembly 100 can be effectively improved.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens assembly testing method, comprising:
   providing a lens assembly comprising a first lens and a second lens optically and mechanically coupled with the first lens, the first lens having a first matching surface, the second lens having a second matching surface, and the first matching surface contacting the second matching surface;
   measuring whether a modulation transfer function value of the lens assembly is in a predetermined range;
   if not, separating the first lens and the second lens, and forming a first coating layer and a second coating layer on the first matching surface to obtain a coated first lens, wherein a color of the first coating layer is different from a color of the second coating layer, the first coating layer completely covers the first matching surface, the second coating layer includes a plurality of dots formed on the first coating layer, shapes of the dots are different from each other, and sizes of the dots are different from each other;
   capturing a first image and a second image of the first matching surface respectively using a first camera module and a second camera module from different directions;
   attaching the first lens to the second lens to obtain a lens assembly, and capturing a third image and a fourth image of the first matching surface respectively using the first camera module and the second camera module from different directions;
   randomly choose one dot from the dots, and determining an actual moving distance of the chosen dot using a 3D-Digital image correlation method according to the first image, the second image, the third image, and the fourth image;
   adjusting a size of the first lens according to the actual moving distance of the chosen dot; and
   displaying the adjusted size of the first lens to a user.

2. The lens assembly testing method of claim 1, wherein the coated first lens is placed at a same position on the second lens as the first lens.

3. The lens assembly testing method of claim 1, wherein an optical axis of the first camera module and an optical axis of the second camera module are symmetrical with respect to an optical axis of the lens assembly.

4. The lens assembly testing method of claim 3, wherein an included angle between the optical axis of the first camera module and the optical axis of the lens assembly is about 45 degrees, and an included angle between the optical axis of the second camera module and the optical axis of the lens assembly is about 45 degrees.

5. The lens assembly testing method of claim 1, wherein the color of the first coating layer is white, and the color of the second coating layer is black.

6. The lens assembly testing method of claim 1, wherein both of an optical axis of the first lens and an optical axis of the second lens are substantially coaxial with an optical axis of the lens assembly.

7. The lens assembly testing method of claim 6, wherein the first matching surface includes a first annular surface, a second annular surface, and a first frustoconical surface, the first frustoconical surface is connected between the first annular surface and the second annular surface.

8. The lens assembly testing method of claim 7, wherein the second matching surface includes a third annular surface, a fourth annular surface, and a second frustoconical surface, the second frustoconical surface is connected between the third annular surface and the fourth annular surface.

9. The lens assembly testing method of claim 8, wherein the first annular surface contacts the third annular surface, the second annular surface contacts the fourth annular surface, and the first frustoconical surface contacts the second frustoconical surface.

10. The lens assembly testing method of claim 9, wherein the size of the first lens includes a first inner diameter and a second inner diameter, the first inner diameter is a distance between an optical axis of the first lens and an intersection of the first annular surface and the first frustoconical surface, and the second inner diameter is a distance between the optical axis of the first lens and an intersection of the second annular surface and the first frustoconical surface.

11. The lens assembly testing method of claim 10, further comprising reducing the first inner diameter and the second inner diameter by a value equal to the actual moving distance.

* * * * *